Aug. 31, 1965 A. MICHEL 3,204,020
APPARATUS FOR GENERATING ELECTRICAL OSCILLATIONS
Filed March 24, 1961 7 Sheets-Sheet 1

INVENTOR:
Adolf Michel
BY
Wupper, Gradolph & Love
Attys

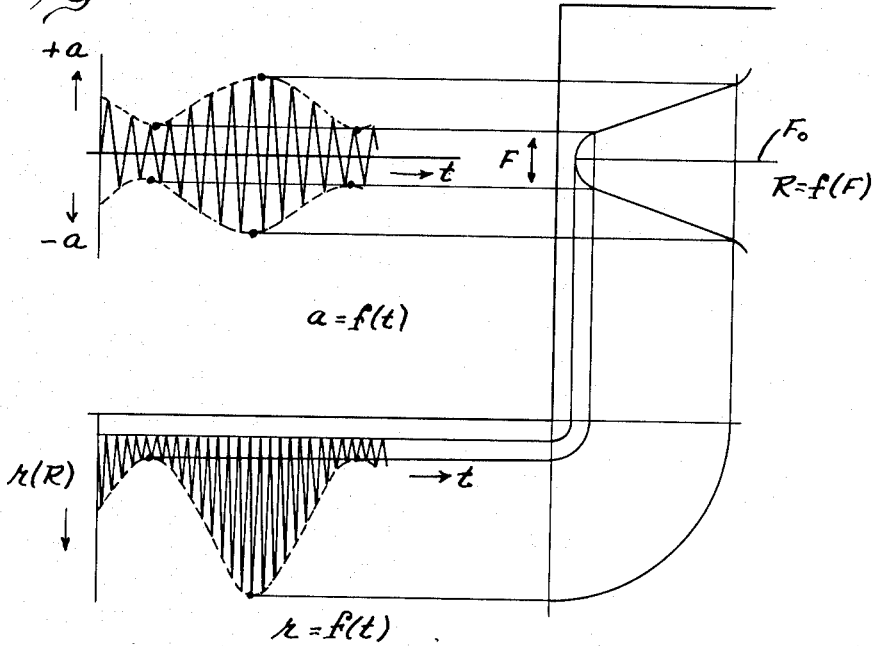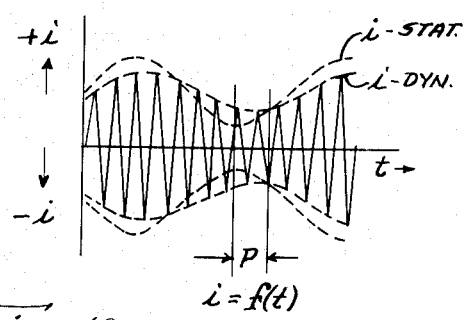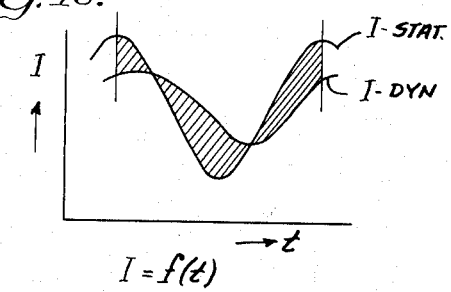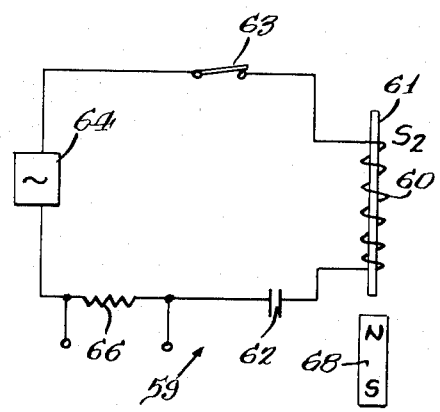

Aug. 31, 1965        A. MICHEL        3,204,020
APPARATUS FOR GENERATING ELECTRICAL OSCILLATIONS
Filed March 24, 1961        7 Sheets-Sheet 3

INVENTOR:
Adolf Michel
BY
Wupper, Gradolph & Love
Attys

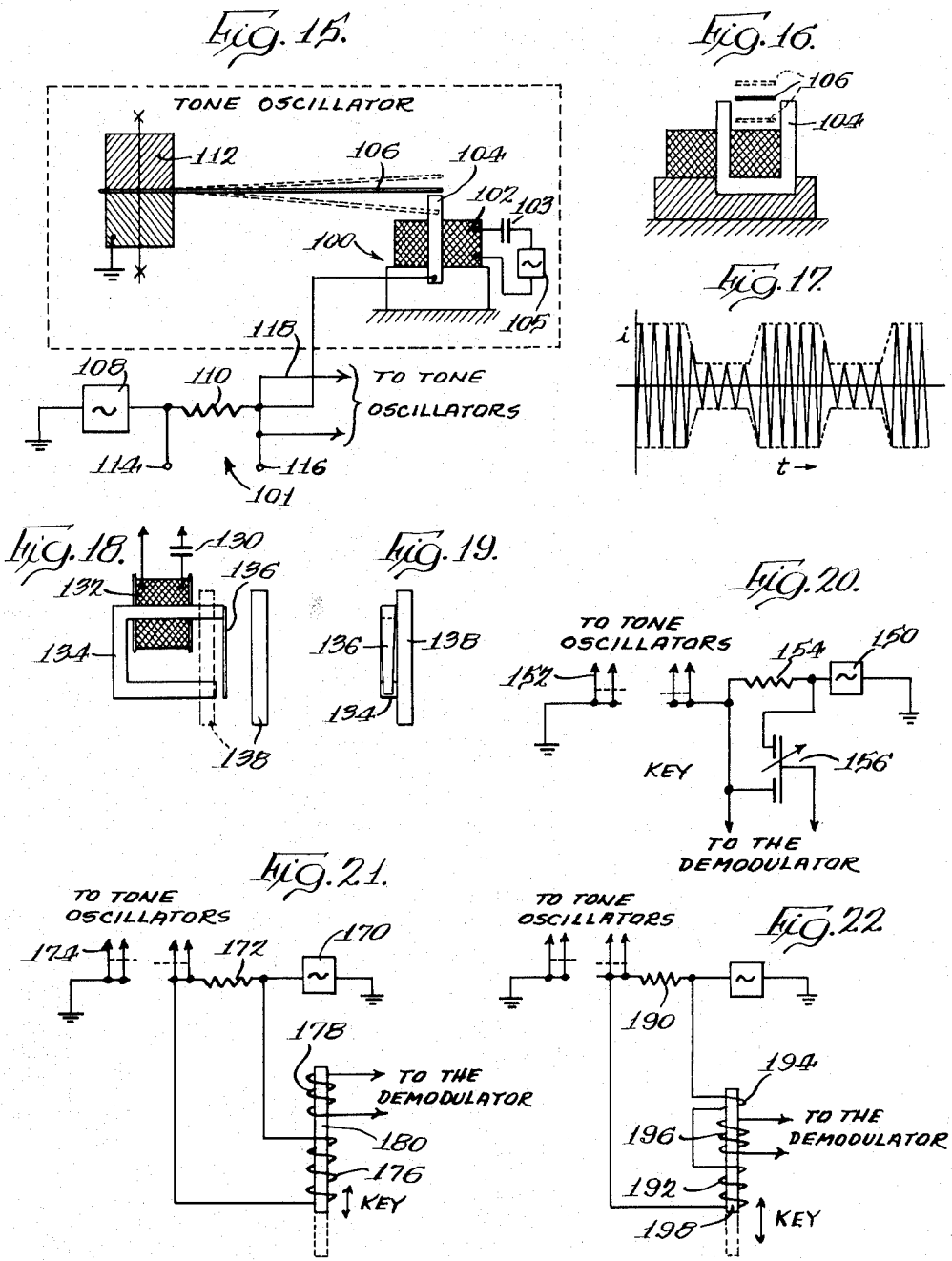

INVENTOR:
Adolf Michel
BY
Wupper, Gradolph & Love
Attys

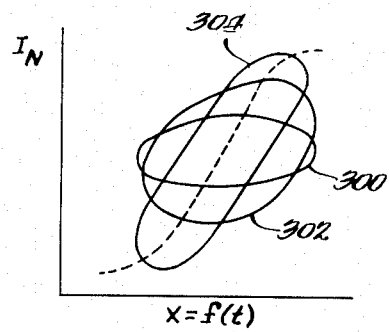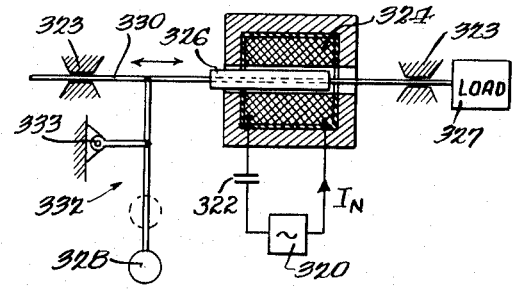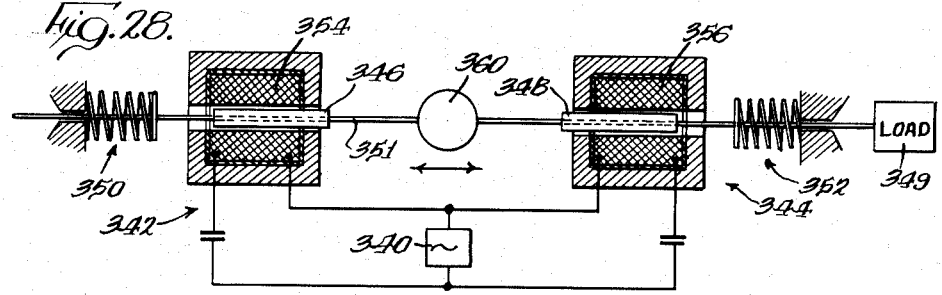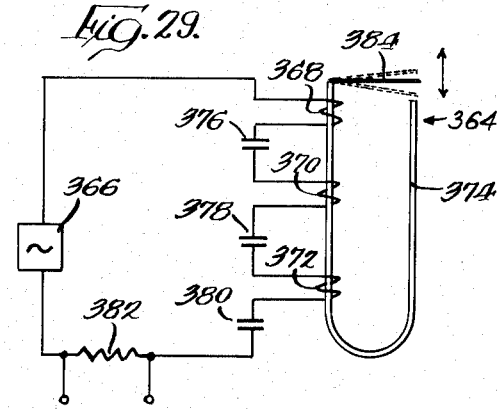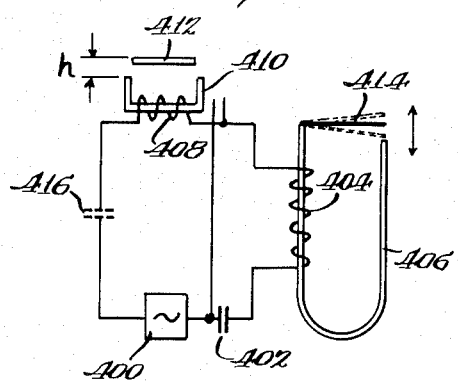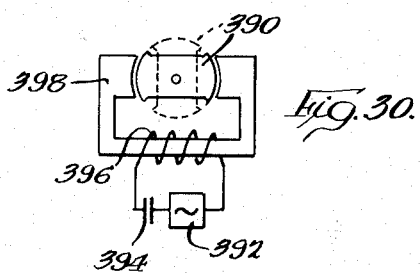

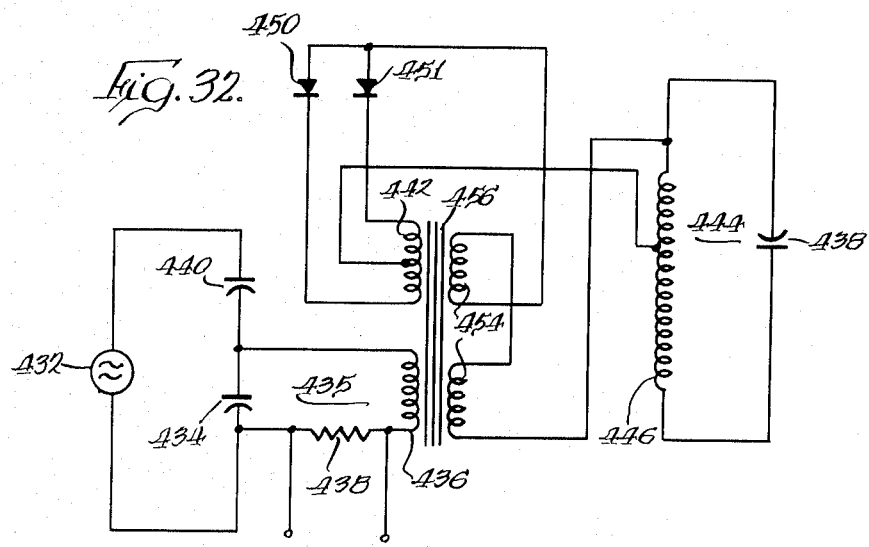
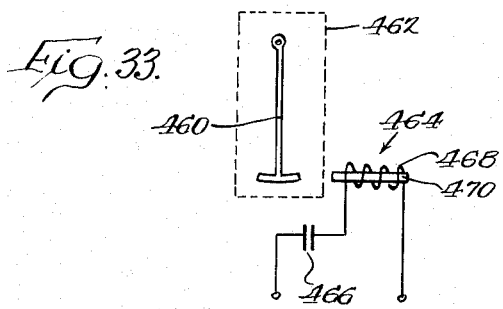

United States Patent Office 3,204,020
Patented Aug. 31, 1965

3,204,020
APPARATUS FOR GENERATING ELECTRICAL
OSCILLATIONS
Adolf Michel, Dietramszellerstrasse 2,
Munich 25, Germany
Filed Mar. 24, 1961, Ser. No. 98,104
1 Claim. (Cl. 84—1.04)

This application is a continuation-in-part of my abandoned application Serial No. 751,104, filed July 22, 1958.

The present invention relates to an improved method and apparatus for generating and/or maintaining mechanical and/or electrical oscillations.

The expression "oscillations" and "vibrations" and "oscillator" and 'vibrator" are used interchangeably herein.

According to the conditions generally required for oscillations, an oscillation is initiated or maintained in a system capable of oscillation if the energy introduced to the system is greater in quantity and phase or is equal to the energy which is consumed by the losses in the system. The introduction of energy is usually controlled by a device which is coupled with the oscillatory system.

The oscillators known in the art fall into two general categories:

(1) Generators of oscillations in which the control of the introduction of energy takes place in phase, both in static and dynamic respects, that is to say, in which the introduction of energy increases or decreases with the instantaneous value of the amplitude of oscillation of the oscillatory system. (By far the greater proportion of all generators of oscillations known in the art are of this type); and (2) Generators of oscillations in which the control of the introduction of energy takes place with a phase inversion of 180° from a static point of view, if a return coupling component were not attained by a dynamic compensation process. In this case, as a rule, it is immaterial whether the control is effected in a linear or nonlinear relationship, if the amount of energy over a period corresponds to the general conditions of oscillation. This type of generator of oscillations is employed only in special cases, partly because of the complicated nature of the wiring diagram and partly because of its lack of reliability. The blocking oscillator is a typical example of this type oscillator.

The active principle of energy-time-hysteresis applied to the improved apparatus hereinafter described provides, with the smallest possible expenditure of energy and with absolute reliability in operation, the generation of mechanical and/or electrical oscillations which may have any desired relationship, rational or irrational, with respect to a driving frequency.

The energy transfer in the improved apparatus of this invention takes the form of a hysteresis curve which, however, in contradistinction to a magnetic hysteresis, is dependent on the frequency of the oscillation produced and is therefore dependent on time. A passive, slightly damped electrical oscillatory System 1 is excited to oscillation by an alternating quantity, for example, a source of alternating current. A physical magnitude of state, that is, a momentary average value of a force which may vary upon a cyclical basis; such as the momentary magnitude of a magnetic field, which is substantially a single-valued function of the energy content of at least one of the energy accumulators, such as an inductive coil, of the System 1 (i.e. the magnetic field can have only one value for a given current flowing in a coil of a given value of inductance) deflects an oscillating System 2, such as a magnetic vibratory reed, which is likewise passive, out of its neutral position. The deflection of System 2 changes one or more of the system values of System 1, such as the inductance or capacitance or both; and therefore changes the resonant frequency of System 1. The energy required by System 1 from the alternating current source and the transfer of energy to System 2 changes with the resonant frequency of System 1.

For example, consider the above said Systems 1 and 2 in a static sense with the System 2 reed being manually placed in the various positions it will achieve during natural vibration. When the reed is moved to a position closer to the inductive element of System 1, it will increase the value of the inductance of the element, thereby to lower the resonant frequency. Assuming that this change in the frequency of System 1 is away from the source frequency, System 1 will present a higher impedance to the source and the current in System 1 will decrease. Alternatively, moving the reed to a position further away from the inductive element lowers the value of the inductance and increases the resonant frequency and current of System 1. Thus, the instantaneous value of the current in System 1 will be dependent upon the instantaneous position of the reed; and the value of this current is a measure of the energy content of System 1.

However, in the dynamic operation of Systems 1 and 2— i.e., the reed is vibrating at its natural frequency—the change in current (or energy content) of System 1 lags the change in reed position by a small phase angle.

Since the energy content of System 1 determines the rate of transfer of energy to System 2 and since the instantaneous dynamic value of the current of System 1 is dependent on and lags the instantaneous state of System 2, the momentary values of the transfer of energy from System 1 to System 2 and the state of System 2 are temporarily displaced. This phase deviation, periodically recurring with the frequency of System 2, results in a transfer of energy to System 2, which is similar to a control by return coupling.

The natural frequency of System 2 will be substantially lower than the frequency of the alternating current source in the first embodiment to be described and it will approximate but not equal the source frequency in the second and third embodiments to be described. In general, it will be advantageous to design the apparatus so that a part of one or more system values of System 2 is simultaneously a part of one or more of the system values of System 1, rather than having intermediate coupling apparatus interposed between the Systems.

Since System 2 moves in cyclical fashion as it vibrates, it will cause the amplitude of the current in System 1 to vary in cyclical fashion.

It is therefore an object of this invention to provide an improved method and apparatus for producing mechanical oscillations and/or an oscillating current of desired frequency from a source of alternating current which has a frequency having any relationship rational or irrational with the desired frequency.

It is an important object of this invention to provide an improved low cost, stable method and means for producing electrical tone signals in an electrical musical instrument.

It is well known to make use of a vibrating reed or tuning fork for the purpose of stabilizing an electronic oscillator at the frequency of the reed or at some harmonically or sub-harmonically related frequency. In one instance, it has been suggested to make use of a specialized saturable core apparatus for the purpose of producing output pulses which are not harmonically related to the frequency of a driving generator. However, so far as is known, no successful use of vibrating reeds or tuning forks has been made for producing output pulses which may have any relationship, rational or irrational, with a driving frequency wherein the output frequency is substantially lower than the driving frequency.

It is therefore a more specific object of the present invention to provide means including a vibrating reed or the like in an electrical circuit driven by a source of alternating current for producing an output current having a desired frequency component equal to the natural resonant frequency of the reed, lower than the driving frequency, and having any functional relationship, rational or irrational, with the driving frequency. In the preferred embodiment, this is accomplished by providing a source of alternating current, a resonant circuit including a resistor, an inductor and capacitor connected in series across the source with the mean value of the resonant frequency of the circuit being slightly below the frequency of the source, and a vibratory reed, the vibration of which is controlled by magnetic flux in the inductor.

It is another object to provide in an electrical musical instrument a single master oscillator (or other source of alternating current) and means including a plurality of vibratory reeds controlled by the oscillator for producing musical tone signals. This object is achieved in the preferred embodiment by connecting a plurality of series resonant circuit-vibratory reed systems of the type described in the preceding object across the same source of alternating current. Each series resonant circuit-vibratory reed system will amplitude modulate the source current at the frequency of its reed and the modulated current will be demodulated by suitable equipment for selection of a signal of the reed frequency. If each reed is one of the semitones of the tempered musical scale, signals corresponding to the scale are produced across the demodulated outputs of the series resonant circuit-vibratory reed systems.

It is another object to provide an unusually low cost, compact electrical musical tone generator which is reliable and stable in its operation and which permits high degree of system flexibility in a musical instrument.

It is another object to provide a biased magnetostrictive element within the coil of a resonant circuit energized by an alternating current source, wherein the natural frequency of vibration of the magnetostrictive element is less than the source of alternating current an amount equal to a desired lower frequency output signal, whereby the source current is modulated at said lower frequency.

It is another object to provide a pair of resonant circuit-magnetostrictive element structures of the type described in the preceding object connected in parallel across a source of alternating current with the two circuits having different resonance values and the inductances of the two circuits being neutrally coupled.

It is another object to provide an improved oscillator in which the movement of a vibrating reed controls a variation in both the capacity and the inductance or alternatively merely the capacity of a series resonant circuit energized by an alternating current source for producing undamped electrical oscillations at the frequency of the reed.

It is another object to vibrate and/or maintain the vibration of a reed at its natural frequency by means of a circuit energized by a source of alternating current having a frequency bearing any relation, rational or irrational, with the reed frequency.

It is another object to provide an improved keying means in apparatus utilizing the improved oscillator of the present invention.

It is another object to provide an improved electric drive means for a magnetic rotor.

It is another object of this invention to provide an improved electrical drive for a clock or watch mechanism.

Other objects and features of the invention will be apparent upon a perusal of the following description taken in conjunction with the accompanying drawings in which:

FIG. 1 is a schematic diagram illustrating one embodiment of the invention which is particularly adapted for use in an electrical musical instrument, such as an organ;

FIGS. 2–6 inclusive are graphs which illustrate the operation of the of the embodiment of FIG. 1;

FIG. 7 is a schematic diagram illustrating a second embodiment of the present invention;

FIGS. 8–10 inclusive are graphs which illustrate the operation of the embodiment of FIG. 7;

FIGS. 15 and 16 are schematic diagrams illustrating a modification of the embodiment of FIG. 1, in which odd and/or even harmonics are readily obtained in the output wave form;

FIG. 17 is a graph illustrating a typical output wave for the embodiment of FIGS. 15 and 16;

FIGS. 18 and 19, 20, 21 and 22 are schematic diagrams illustrating improved keying arrangements for the improved oscillation generator of this invention which are particularly advantageous for use in electric organs or the like;

FIG. 25 is a schematic diagram illustrating the use of the present invention in an electric organ or the like;

FIG. 26 is a graph showing the effect of loading on the frequency of the System 2; and FIGS. 27–33 inclusive are schematic diagrams illustrating further embodiments of the invention.

Figure 1:
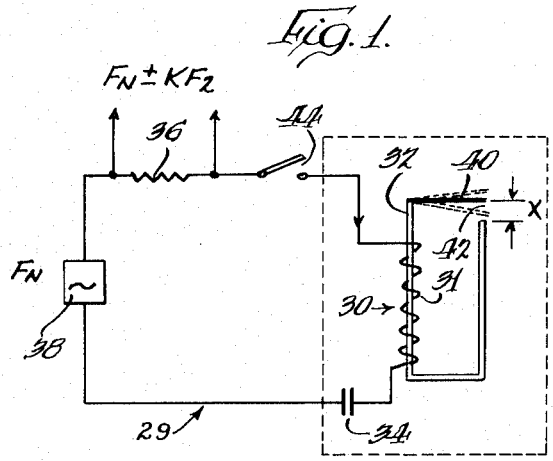

In the embodiment of FIG. 1, the System 1 takes the form of a series resonant circuit 29 comprising a magnetic inductor 30 including a coil 31 and a core 32, a capacitor 34 and a resistor 36. The capacitor, resistor and coil are connected in series across a source of alternating current 38, which source may be any well known electronic oscillator or electrical generator. The resonant frequency of the series circuit is approximately equal to but preferably slightly less than the frequency of the source 38. In a typical electric organ, the frequency of the source may be in the order of thirty kilocycles and the average or mean resonant frequency of the series circuit will preferably be the difference between the source frequency and the desired output frequency of amplitude modulation of the source. Thus, where a desired output amplitude modulating frequency of a thosuand cycles is desired, the mean resonant frequency of the series resonant circuit will be thirty kilocycles minus one kilocycle or twenty-nine kilocycles.

A vibratory magnetic element, such as a reed 40, illustrated diagrammatically, is connected in the magnetic circuit of the inductor so that the position of the reed will affect the inductance value of the inductor. A magnetic circuit which includes the core 32 and the reed 40 defines an air gap 42, the instantaneous length of which is indicated by the letter $x$; and the length of this air gap determines the instantaneous value of the inductance in the series resonant circuit. A switch 44 is provided in the series resonant circuit for controlling the energization of the series circuit by the source 38.

The operation of the embodiment of FIG. 1 will be described and reference to FIGS. 2-6 may be had for a better understanding. The legends used in the graphs of FIGS. 2-6 are as follows:

$f$ = the mathematical symbol for "function of";
$Fn$ = frequency of the source 38;
$F_2$ = the frequency in operation of System 2, i.e. reed 40;
$(G)$ = the absolute value of the variable complex conductivity of the resonance circuit 29 (System 1);
$I$ = the amplitude of the source current flowing through the resonance circuit;
$i$ = the momentary value of the current flowing through the resonance circuit;
$x$ = the air gap in the magnetic in circuit;
$p$ = the amount of the phase shift periodically recurring with the frequency of System 2 (reed 40) between the temporary (dynamic) state of the current of System 1 (the series resonant circuit 29) and the static current, which would correspond to this state from any desired point.

Assume that the reed 40 is in its at rest position and the switch 44 is closed to energize the series resonant circuit. Since the series circuit has a resonant frequency close to that of the source, a relatively strong current will flow therethrough producing a relatively strong magnetic field which attracts the reed. It will be assumed that the resonant frequency is slightly less than the source frequency.

As the reed is moved by the field to reduce the air gap 42, the value of the inductance in the series resonant circuit begins to increase. Since the resonant frequency of the circuit is an inverse function of its inductance, the resonant frequency of the circuit begins to decrease, and therefore shifts further away from the frequency of the source. This causes a reduction in the value of the alternating current flowing through the series resonant circuit, but the change in current lags the change in reed position and inductance by a small phase angle. During this process of the continuing movement of the reed to shorten the air gap, thereby to decrease the resonant frequency of the series resonant circuit and to decrease the current therethrough, the series resonant circuit delivers energy to the reed.

This process continues until a balance is obtained between the attraction of the reed by the magnetic field of the decreasing series resonant current and the free forces of the reed displaced from its normal at rest position. However, the reed overshoots the balance position which would occur if the forces acting on the reed during its dynamic operation were the same as the forces which would act on the reed under static conditions, i.e., the position in which the reed when manually adjusted would have a restoring force equal and opposed to the force of the magnetic field in that position of the reed.

It is the decreasing current lagging the displacement of the reed and the momentum of the reed which carry the reed past the static balance position. If it were assumed incorrectly that the reed approached and momentarily stopped at the exact static balance position and that there were no lag in the decreasing current, it might be assumed correctly that the reed would be held in this position and therefore not oscillate. However, since the decrease in current is lagging the movement of the reed and the current is a measure of the energy being transferred to the reed to cause displacement, the energy delivered to the reed during its dynamic operation is in excess of the theoretical transfer of energy under static conditions. This excess energy tends to swing the reed beyond the static balance position. This excess energy and additionally the momentum of the reed therefore move it beyond the static balance position.

The reed in this dynamic balance position has a restoring force, received from the inductor during its movement from the at rest position, which is greater than the force of the magnetic field produced by the current at this instant. The reed will therefore tend to reverse its direction and move toward its at rest position; and in doing so, will be carried across the static balance position. In moving to this position the reed will achieve an increased velocity and therefore an increasing amount of kinetic energy. The value of the current at this moment when the reed overshoots the static balance position, and therefore the force of the magnetic field produced by the current in the coil, will be insufficient to stop the movement of the reed. Although the movement of the reed now decreases the inductance and therefore increases the current through the coil and its consequent magnetic field, the force produced by the field will not be sufficient to stop the movement of the reed until the reed has passed its at rest position and moved in the opposite direction to a position in which the forces in the spring resisting further movement together with the increasing magnetic field forces acting on the reed together are sufficient to reduce the reed velocity to zero. The reed will then start moving in the gap-reducing direction again.

Thus, assuming that there is sufficient net transfer of energy from the series resonant circuit to the reed to overcome the damping of the reed system, there will be an assurance of the movement of the reed in an oscillatory fashion at its natural resonant frequency. The output signal across resistor 36 will therefore contain the initial signal frequency $Fn$ and a modulating signal frequency corresponding to $\pm KF_2$ with $F_2$ being the reed frequency and $K$ being the various harmonics of $F_2$.

The amount of the net transfer of energy to the reed during each cycle of vibration in relation to the damping losses which consume the energy transferred will determine the time required for the oscillations of the reed to reach their maximum amplitude. This time element can be held to a minimum when necessary by an adequate power source 38.

The most favorable operating conditions are achieved when the mean value of the constantly varying resonance frequency of the series resonant circuit is equal to the source frequency minus the frequency of the reed.

Figure 2:
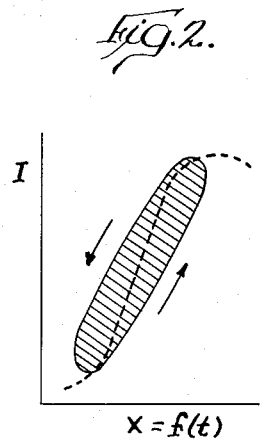
Figure 3:
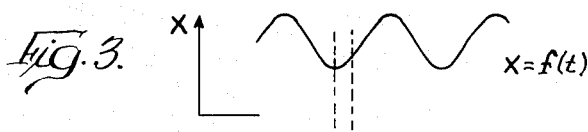
Figure 4:
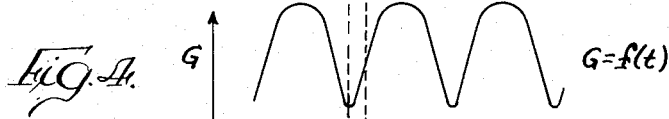
Figure 5:
Figure 6:
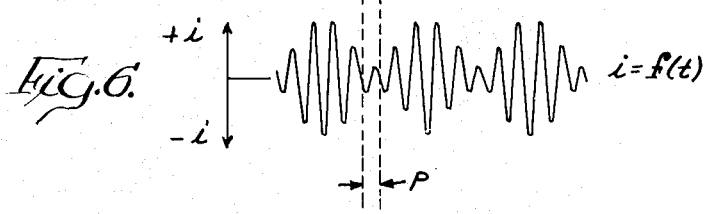

The above mentioned phenomenon whereby the instantaneous value of the current in the series resonant circuit lags the instantaneous position of the reed is illustrated in FIG. 2, wherein it is seen that this lag in current on both sides of the static current-air gap curve of the broken line results in a hysteresis curve with respect to the energy supplied to and withdrawn from the reed. It can be seen that this hysteresis curve for the transfer of energy is a function of time or more particularly a function of the frequency of the reed. Since the instantaneous value of the current in the series resonant circuit is a measure for the energy supplied to the reed during one period of oscillation and for the energy returned by the reed to the series resonant circuit, the shaded area between the current-air gap values is a function of the net energy delivered to the reed for maintaining oscillations and overcoming the effects of damping.

A similar mode of operation may also be attained by an embodiment otherwise similar to that of FIG. 1 except that a parallel resonant circuit instead of a series resonant circuit may be used. Also a combination of a parallel and series resonant circuit will achieve a similar mode of operation.

It has been seen above that the current in the series resonant circuit is increased and decreased cyclically in accordance with and at the same rate as the movement of the reed. The current from the source 38 will therefore be amplitude modulated at the reed frequency (FIG. 6) and these amplitude modulated signals will produce an amplitude modulated voltage across the resistor 36 which is in series with the inductance and capacitance. The voltage produced across the resistance 36 may then be coupled in any well known manner to a utilization circuit, for example, for demodulation and the use of the modulating frequency only.

It will be appreciated that if a low impedance generator 38 having a frequency somewhat above the audible range is provided, for example 30 kc., and if a reed is provided with an audible sonic frequency characteristic, a sonic frequency of extreme uniformity and stability can be produced. Also, since the source frequency may have a relationship with the modulating frequency which is rational or irrational, it is possible to connect a plurality of series resonant circuits and cooperating reeds with differing audible frequency characteristics to the source to produce a great number of differing audible frequencies. Since only one carrier frequency source, such as 38, is necessary, this embodiment is particularly suitable for the production of a low cost musical tone generator for use in an electrical musical instrument as will be described in more detail with respect to FIG. 25. In a typical commercial embodiment, the components of FIG. 1 may take the following values:

Generator 38, a thirty kilocycle two volt output;
The capacitor 34, .005 microfarad;
The inductance 30, 6 millihenrys;
The resistance 36, 2 ohms.

Since the instantaneous resonant frequency of the series resonant circuit is a function of the air gap length 42, the cyclical variation in the resonant frequency of the series resonant circuit 29 may be altered by changing the initial at rest position of the reed to change the forces in the reed during vibration, thereby to vary the mean value of the air gap length. In this manner, simplification of the magnetic circuit structure and/or designing the structure for a particular mode of operation may be used to advantage. It is possible by proper control of the air gap variation to introduce harmonic wave content of desired amount into the modulation envelope.

When the value of the resistor 36 is varied over wide limits, e.g., less than 2 ohms to in the order of 40 ohms, the mean values of the resonant frequency and of the current of the series resonant circuit will vary slightly as an inverse function of the resistance value; and the net energy transferred to the reed will be varied accordingly to increase or lower the amplitude of reed vibration and the amplitude of modulation of the source frequency. Adjustment of the resistance value may therefore be utilized to obtain a desired amplitude of modulation. In addition, by reducing the resistance so as to increase the current to a value at which maximum amplitude of vibration of the reed is achieved, a harmonic wave content may be introduced into the modulation envelope.

It will be appreciated that other products of modulation inherently in the series resonant circuit 29, such as the phase modulation of the carrier or source frequency at the reed frequency, may be taken off and suitably detected for use in a well known manner. These signals have been found to be rich in harmonics and are therefore preferred in some applications. Alternative use of the upper and lower sideband frequencies with differing harmonic contents may be used after demodulation for different tone qualities in musical instruments.

Figure 11:
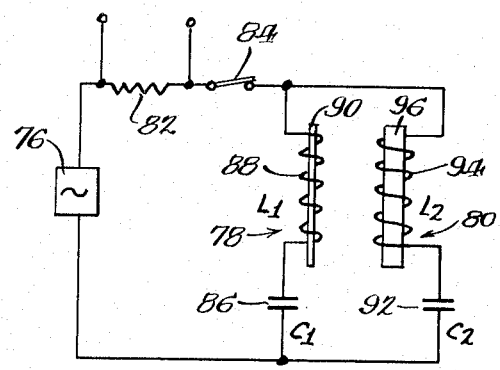
FIGS. 11 and 12 are schematic diagrams illustrating a third embodiment of the present invention.
Figure 12:
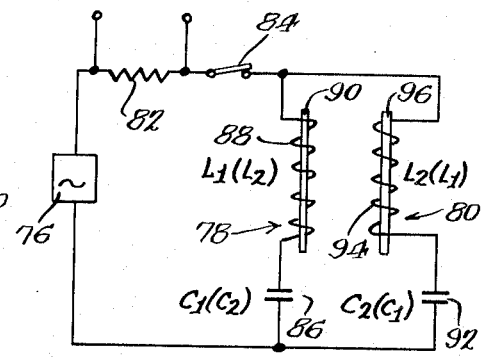
Figure 13:
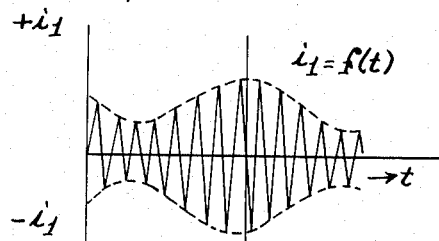
FIGS. 13 and 14 are graphs illustrating the operation of the embodiment of FIGS. 11 and 12.

The embodiments of the invention shown in FIGS. 7, 11 and 12 are particularly suitable for the production of electric oscillations in which the natural frequency of System 2 is close to the frequency of the source of alternating current. If the oscillating System 2 with the natural frequency $F_2$ is excited by the application of a frequency $F_1$ and if the difference $F_1-F_2$ is not particularly large (e.g. 10% of $F_2$), then the oscillating System 2 comes into oscillation with the frequency $F_1$ according to an $e$-curve, over which the frequency $F_1-F_2$ is superimposed as a modulation. The amplitude of the modulation is thereby determined by the Q of the oscillating System 2 and ratio $$\frac{F_2}{F_1}$$

(For the same reason, also, the reed 40 of FIG. 1 has the most energy introduced therein when the mean value of the constantly changing natural frequency of the series resonant circuit equals the source frequency minus the reed frequency.)

The embodiment of FIG. 7 consists of a series resonant circuit 59 (System 1) including an inductive coil 60, a capacitor 62 and a resistor 66 and of a mechanical oscillator 61 (System 2) in the form of a magnetostrictive oscillator—e.g., a ferrite rod—, which by its geometric changes in the oscillating state (change of the quantity of state of System 2) influences the inductance (system quantity) of the coil 61. A switch 63 controls the connection of a source of alternating current 64 to the resonant circuit, and the output voltage is developed across the resistor 66. In order to insure an excitement of the ferrite rod at the frequency of the source of alternating current rather than at its second harmonic, the ferrite rod is magnetically biased by a permanent magnet 68 so that as the alternating current changes from positive to negative there will be no change in direction of the flux. The manner of operation, similar to that in FIG. 1, will now be described, reference being directed to FIGS. 8–10 for a better understanding.

The following symbols in FIGS. 8–10 signify:

$t$=mathematical symbol for "time";
$F$="frequency" (e.g. $F_2$=natural frequency of System 2 and $F_t$=sonic or tone frequency);
$f$=mathematical symbol for "function of";
$\pm a$=momentary value of the deformation of the ferrite rod (System 2);
$R$=complex resistance of the series resonant circuit dependent on the natural frequency (controlled by System 2) of System 1;
$r$=momentary value of the complex resistance (Impedance) of System 1, in which (R) is the broken line enclosure curve;
$\pm i$=momentary value of the current flowing through the series resonance circuit (System 1);
$P$=the value of the phase shift periodically recurring with the frequency $F_2-F_1$ between the temporary state (dynamic) of the current amplitude (broken line enclosure curve) of System 1 and of the stationary current amplitude which would correspond to this state at a desired point;
$I$=current amplitude of System 1 (the shaded surface is a measure for the energy introduced to System 2).

On closing the switch 63, the current source 64 produces in the coil of the series resonant circuit (System 1) a corresponding magnetic field which excites the ferrite rod into mechanical, magnetostrictive oscillations at the frequency of the source rather than at its natural frequency. With each mechanical oscillation antinode of the ferrite rod, the inductivity of the magnetic coil is increased, and thus the frequency of the series resonant circuit is varied; however, the consequent change in current lags the change in resonance of the circuit as it did in the embodiment of FIG. 1. If the inherent resonance of the ferrite rod is characterized by low energy loss and high selectivity (commonly referred to as high Q), it comes into oscillation when excited with the source frequency modulated in amplitude with the difference in frequency between the source and the natural frequency of the ferrite rod (FIG. 8). Thus the circuit will have a resonant frequency $F_0$ at the point of equilibrium and the actual resonant frequency will vary about this value as the circuit constants change.

More specifically, the series resonant circuit 59 is excited with a frequency close to its resonance frequency by means of the source 64. The ferrite core 61 is excited to oscillation by the magnetic field produced in its coil 60. Because of the high Q of the ferrite core, it tends to come into oscillation at the source frequency modulated in amplitude with the above said difference frequency. As the ferrite core configuration varies toward the first oscillation antinode of the modulation, the inductivity of the magnetic coil 60 is increased owing to the greater mechanical deformation of the ferrite rod. Because of the non-linearity of the resonance characteristic line of the series resonant circuit, the mean value of the complex resistance of the series resonant circuit is increased. The current flowing through the series resonant circuit and consequently the magnetic field of the magnetic coil will decrease with the change in the mean value of the complex resistance of the series resonant circuit, but with a delay in time, because the amplitude of oscillation of the series resonant circuit decreases by way of the low resistance source 64. Thus the ferrite rod receives, considered over this half period of the difference in frequency $F_2-F_1$, dynamically, more energy than would be the case, considered statically, because of the lagging current change in the series resonant circuit (FIGS. 9 and 10).

In the following half period of the difference of frequency $F_2-F_1$, the mean value of the reactance of the series resonant circuit will decrease, due to the same control of the series resonant circuit by the amplitude of the oscillation of the ferrite rod which is now becoming smaller, and the ferrite rod seeks to transfer its energy to the source by way of the series resonant circuit. This, however, is again delayed in time because of the lagging current and the ferrite rod during this half period gives off less energy than—considered statically—it would give off by its control of the mean value of the complex resistance of the series resonant circuit. Now this process can be repeated and a hysteresis is observed between the energy introduced to and taken from the ferrite rod which maintains the rod in oscillation at the source frequency $F_1$ modulated with the frequency $F_1-F_2$.

A further modification shown in FIGS. 11 and 12 is interesting because the functions of System 1 and System 2 are no longer exactly demarcated. This embodiment comprises two magnetically coupled electric oscillating cycles in which a source of alternating current 76 is coupled to a series resonant circuit 78 (System 1) tuned approximately to the source frequency and to an electrical oscillator 80 (System 2) by means of a resistor 82 and a switch 84. The circuit 78 includes a capacitor 86 and a coil 88 with a core 90, and the circuit 80 includes a capacitor 92 and a coil 94 with a core 96 which is substantially larger than core 90. The circuit 80 is tuned to a frequency equal to the difference between the source and the desired low frequency, and the coils 88 and 94 are magnetically coupled. Since the core 96 is larger than the core 90, it dominates the interaction between circuits 78 and 80, that is, the amplitude of oscillation of System 2 effects by means of its magnetic field such a change in the inductance in the magnetic circuit of System 1, that the permeability of the core 90 and with it the inductance of the coil 88 of System 1 is changed substantially.

The combination of the operation of the resonant circuit 78 along the side of the resonance curve of the source frequency with the non-linear behavior of the mutual coupling between coils 88 and 94 results in the modulation of the source frequency by the desired frequency in both resonant circuits. This amplitude modulation of the source current in System 1 is substantial because System 1 is closely tuned to the source for maximum reactance change. The resonant circuit 80 need not be electrically coupled to the source 76; rather it can receive its energy solely by transfer from System 1 through the magnetic coupling between coils 88 and 94.

The embodiment of FIG. 12 is the same as that of FIG. 11 except that the core 96 is only slightly larger than the core 90. In this embodiment, the core 90 and its coil 94 no longer clearly dominate the interaction between Systems 1 and 2; and the apparatus may be rendered unstable.

With reference to FIGS. 11 and 12, the following symbols mean:

$L_1C_1$=System (1)
$L_2C_2$=System (2)
(Numbers in parentheses above indicate the more or less substantial flowing together of both operative functions).
$\pm i_1$=momentary value of the current of System 1.
$\pm i_2$=momentary value of the current of System 2.
$p$=the amount of the phase displacement of the current amplitudes (broken line enclosing curves) of Systems 1 and 2 at any desired point which periodically recurs with the frequency $F_M-F_{2(1)}$.

FIGS. 15, 16 and 17 illustrate a modification of the embodiment of FIG. 1 which is particularly suitable for the production of signals which are rich in harmonic wave content by varying the values of the capacity or inductance or both. This embodiment includes a circuit 101 having a high frequency (e.g. 3 megacycles) source 108, a capacitance which is provided by the air gap between a vibrating reed 106 and a yoke-shaped core 104, a resistor 110, and a mounting block 112 of the reed. The reed is vibrated at its natural frequency by a series resonant circuit including coil 102 of an inductor 100 and a capacitor 103 energized by a lower frequency (e.g. 30 kilocycles) source. The vibrating reed changes the value of the capacitance in the circuit 101, thereby to vary the reactance in the circuit 101 and the voltage drop across the resistor 110.

The output is taken across the terminals 114 and 116 which are connected across the resistor 110. Conductors 118 are connected to a plurality of other similar tone oscillators, each of which includes a vibrating reed; however, the reeds will have natural frequencies of vibration which differ from each other.

As best seen in FIG. 16, the initial at rest position of the reed 106 in relation to the yoke 104 will determine the variation of capacity and inductance and the overtravel of the reed into the space between the yoke legs will determine the amount of harmonic content added to the fundamental modulating wave. It is to be noted in this regard that the at rest position of the reed in the various embodiments does not coincide with the neutral (center of the path of vibratory movement) of the reed; but the at rest position does in part determine the neutral position; and if the dynamic mean or neutral position of the reed is closer to or further away from the yoke, it is possible to vary the amount of harmonic content which is introduced into the modulation envelope of the carrier frequency.

FIG. 17 shows a typical wave form rich in harmonics which may be obtained from the circuit of FIGS. 15 and 16. The reed may be made to change an inductance rather than a capacitance in FIG. 15.

FIGS. 18 and 19 are fragmentary views of a modification of the embodiments of FIGS. 1 and 15 in which the energization of the tone oscillator is controlled magnetically without requiring a mechanical switch. More particularly, FIG. 18 shows a capacitor 130 and an inductive coil 132 having a core 134 which are part of a series resonant circuit. A vibrating reed 136 is positioned adjacent the core for vibratory movement. In addition, a shunting bar 138 of a magnetic material is positioned adjacent the core 134 and is movable from the solid line position to the broken line position shown in FIG. 18. In the broken line position of the shunting bar, the vibratory reed 136 is short circuited magnetically by the bar and cannot therefore be excited into vibration. The position of the shunting bar 138 will therefore determine whether or not the carrier current flowing in the coil 132 and the capacitor 130 will be modulated at the frequency of the reed. In addition, the bar in its shunting position raises the inductance to a very high value, detuning the series circuit so drastically that the current in the series circuit is reduced to a very low value. Thus the shunting bar acts as a contactless switch for turning the oscillator on and off.

FIG. 20 is a fragmentary circuit diagram of a further modification of the improved tone generator of FIG. 15 in which a source of auxiliary carrier current 150 (corresponding to source 108) is connected by way of a common resistor 154 and terminals 152 to a plurality of tone oscillators similar to those shown in FIG. 15. A register switch-operated variable capacitor 156 is connected across the resistor 154; and, in the depressed position of the switch (not shown), the capacitor will have a value providing a suitable coupling to an associated circuit (not shown). Thus with the plates of capacitor 156 decoupled no signal is permitted to pass to the demodulator, while coupling the plates of course permits the signals to pass.

The embodiment of FIG. 21 is somewhat similar to that of FIG. 1 except that an inductive output coupling from a plurality of tone oscillators is provided. Thus the embodiment of FIG. 21 includes a source of carrier current 170 (corresponding to source 38) connected to a plurality of tone oscillators by a resistance 172 and a plurality of terminals 174. A coil 176 is connected in parallel across the resistor 172 and a second coil 178 is positioned adjacent the coil 176. A bar of magnetic material 180 is mounted for reciprocable movement within the coils 176 and 178 and is selectively operated by a playing key (not shown) whereby upon depression of the key, the bar is moved from the broken line position to the solid line position shown in the drawing in which latter position the coils 176 and 178 are closely coupled so that signals may be passed to the demodulator. When the key is released, the bar 180 will be returned, for example, by a biasing spring (not shown) to the broken line position, in which the coupling between the coils 176 and 178 is insufficient to produce an appreciable output voltage and therefore no output is provided. The magnetic bar 180 is preferably within the coil 176 in all positions thereof and the inductance of the coil 176 is therefore maintained substantially constant so as to enable the tone oscillators to be continuously operated and provide the desired output.

It will be appreciated that a varying resistance may be used for coupling the output of the tone oscillators to the demodulator.

The embodiment of FIG. 22 is the same as that of FIG. 21 except that the output taken off across the resistor 190 is placed across a primary winding 192 and a bridge winding 194 which is wound in a direction opposite that of winding 192. The use of the bridge winding 194 will prevent low level output signals when the key is in the released position and will also be useful in minimizing transient noise. This is particularly important in musical instruments. As in the embodiment of FIG. 21, the windings 192 and 194 are coupled to a secondary winding 196 in the depressed position of the key by means of a non-permanent magnetic bar 198.

A change in the harmonic content of the modulating wave form may be achieved by changing the damping in the vibrating reed, for example, by changing the eddy current losses in the reed, by physical shaping of the core and/or reed, and by varying the amount of net energy transfer to the reed.

It may occasionally be advantageous for the best and most economical operation of the switching means for connecting several tone oscillator outputs simultaneously to the demodulator to make use of auxiliary sonic frequency carriers of a frequency differing from that of the source, for example as shown in FIG. 15, and mixing these auxiliary carriers with the outputs of the tone oscillators, whereby the auxiliary carriers modulated with the tone signals may be selectively filtered out by differing circuits for individual application to the demodulator. This will give a high degree of system flexibility.

Also, a frequency double that of the vibrating reed in the oscillator of FIG. 15 may be taken off from a symmetrically arranged takeoff device or from a properly shaped exciter yoke.

By percussion or plucking of the reed, it becomes possible to shorten the length of time which is required for the reed to reach its condition of maximum vibration subsequent to initial energization of the series resonant circuit. It is also possible to shorten the time required for coming into oscillation by the reed by means of increasing the amount of energy introduced into the series resonant circuit and therefore the amount of energy transferred to the reed during each cycle when building up to its maximum rate of vibration. Similarly, the mechanical damping of the reed may be increased to shorten the time required for the reed to stop subsequent to deenergization of the series resonant circuit.

Figure 23:
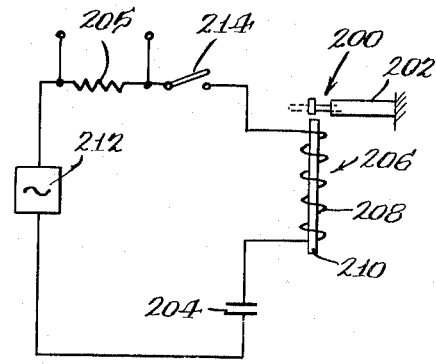
FIGS. 23 and 24 are schematic diagrams illustrating another embodiment of the invention, in which the vibratory member is latched in a prestressed position.
Figure 14:
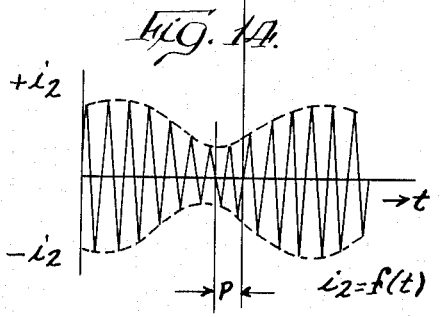

It is also possible to cause the reed to oscillate at substantially its full rate of vibration instantaneously by a static pretensioning of the reed in its quiescent state. For example, FIGS. 23 and 24 show an embodiment otherwise similar to that of FIG. 1 except that a latch mechanism 200 in one position maintains a reed 202 in a flexed position shown by the solid lines in FIG. 24, which position is displaced from the normal at rest position shown by the broken lines and which may correspond to the position of maximum swing of the reed in its normal path of vibration when excited by a series resonant circuit comprising a capacitor 204, a resistor 205 and an inductor 206 including a coil 208 and the core 210, which circuit is energized by a source of alternating current 212.

Figure 24:
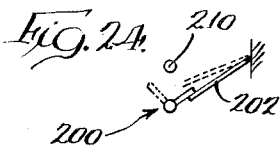

When the latch is released to its broken line position shown in FIG. 24, the reed is released to vibrate substantially at the full amplitude of vibration at which it is normally maintained by the series resonant circuit. If the latch is controlled by an element (not shown) for turning the apparatus, on and off, and assuming that the same element controls the switch 214 for connecting the source 212 to the series resonant circuit, the vibration of the reed at full amplitude will be instantaneous upon actuation of the element. Upon release of the element, the switch 214 will open and the latch will move to its solid line position picking up the reed as it moves. This embodiment is particularly advantageous in a device wherein a minimum amount of energy is supplied from the source 212 to the series resonant circuit and therefore to the reed 202. Since it requires more energy to initially increase the reed vibration to a desired amplitude than to maintain the reed in vibration at the desired amplitude, a minimum amount of energy is expended in achieving the ultimate result of amplitude modulating the carrier current at the reed frequency. There may be instances in which it is not possible or practical to initiate oscillations of the reed but merely to maintain oscillation of the reed once the oscillation is started. In this event, the embodiment of FIGS. 23 and 24 will be particularly advantageous.

In the event that an auxiliary source of alternating current is used to energize the series resonant circuit in the various embodiments at a value which will not start oscillation of the System 2 but at a value transferring sufficient energy to the reed for very high speed oscillation build-up of the System 2 upon energization of the series resonant circuit by the primary generator, precautions must be taken so that the auxiliary source will not maintain oscillation of System 2 when the primary source is disconnected.

Figure 25:
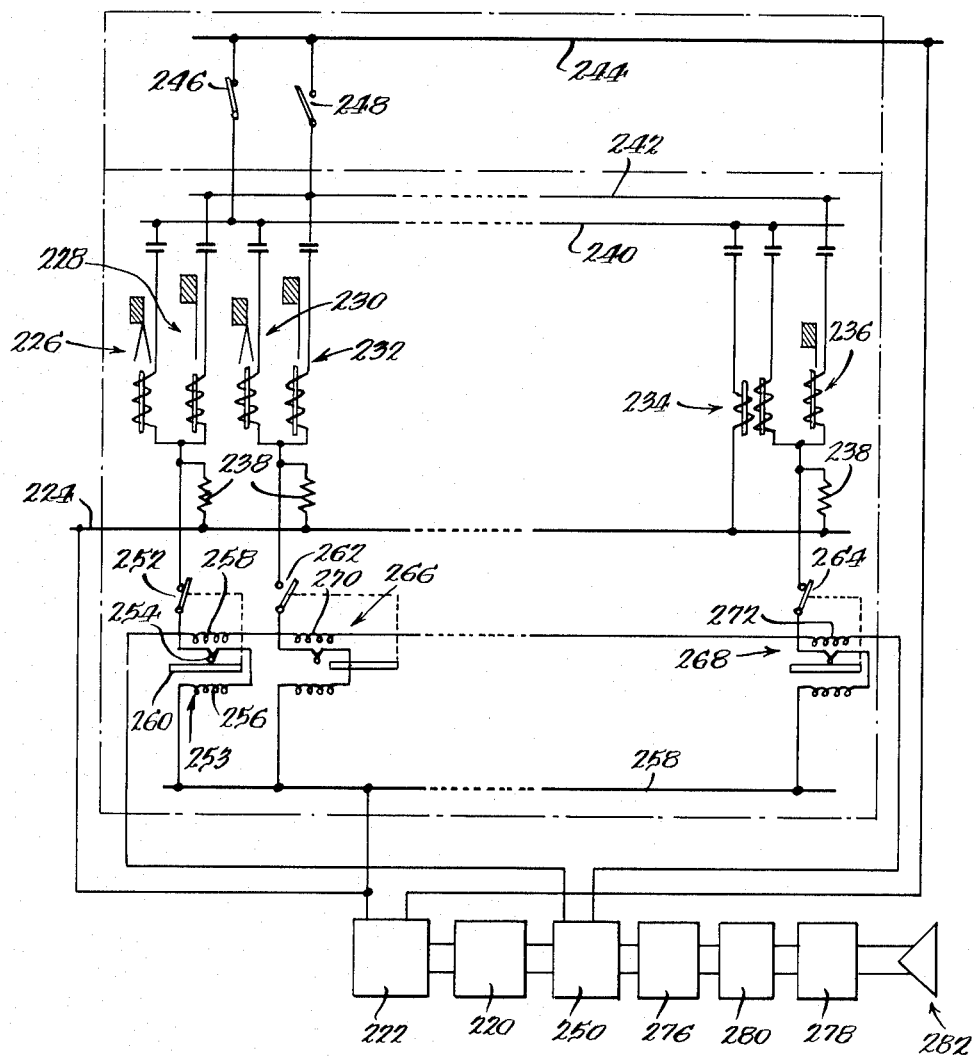

FIG. 25 illustrates diagrammatically an electrical musical instrument embodying the teachings of this invention which is provided with a four and a half octave manual with fifty-four playing keys (not shown) and in which the tone oscillators of FIGS. 1 and 11 are utilized. The instrument of FIG. 25 comprises a suitable carrier frequency generator 220 operating preferably at 30 kilocycles. The generator is coupled to an electronic amplifier 222, the output of which is connected to bus bars 224 and 244; and the bus bar 224 is coupled to the resistor 238 of each tone oscillator. The tone oscillators 226, 228, 230, 232 and 236 which are in the low and medium tone frequency range of the musical scale are of the type shown in FIG. 1 and each comprises a series resonant circuit and a vibrating reed. The tone oscillator 234 which is in the high frequency end of the musical scale provided is of the type shown in FIG. 11. The series resonant circuits of the tone oscillators 226, 230 and 234 are connected to a first register bus bar 240, and the series resonant circuits of the tone oscillators 228, 232 and 236 are connected to a second register bus bar 242. The register bus bars 240 and 242 are connected to the bus bar 244 by way of respective switches 246 and 248. It can be seen therefore that when the register switch 246 is closed, the tone oscillators 226, 230 and 234 are continuously energized and that when the register switch 248 is closed, the tone oscillators 228, 232 and 236 will be continuously energized. Each playing key can therefore control the outputs of two oscillators. Each pair of oscillators may have harmonically related musical tones; and by actuating one register switch or the other the musical scale of the instrument may be shifted one octave to extend the scale range of the manual.

The outputs from the various tone oscillators are taken across their respective resistors 238. Thus the outputs from the oscillators 226 and 228 are coupled to the input to a demodulator 250 by way of a switch 252 and an inductive coupling circuit 253 which will now be described in detail.

The switch 252 which is actuated by a playing key (not shown) corresponding to the pitch of the tone oscillator 226 is connected in series with reversely wound coils 254 and 256 between the series resonant circuit of oscillator 226 and a bus bar 258, which bus bar is connected to the same output terminal of the amplifier 222 as the bus bar 224. Thus the series connected coils 254 and 256 are connected in parallel with the decoupling resistor 238 in a manner similar to that shown in FIG. 22. The playing key which actuates the switch 252 also actuates a non-permanent magnetic bar 260 so that the switch closes as the bar begins to slightly couple the winding 256 with a secondary winding 261 which is connected to the demodulator 250.

Similarly, playing key operated switches 262 and 264 and inductive coupling devices 266 and 268 are provided for coupling the outputs of the tone oscillators 230 and 232 and 234 and 236 to the demodulator 250 upon depression of the respective playing key. The inductive coupling devices 266 and 268 include secondary output windings 270 and 272 which are connected in series with the winding 258 for application of signals induced therein to the demodulator. The remaining tone oscillators (not shown) are similarly provided with coupling means for impressing their outputs upon the demodulator. The demodulator 250 is connected to a filter 276 which is connected to an amplifier 278 by way of a suitable swell control 280 and the output of the amplifier is applied to a speaker system 282.

In the operation of the musical instrument of FIG. 25, a switch (not shown) will be actuated to connect the generator 220 to a suitable source of power (not shown) and the generator will apply a 30 kilocycle voltage source across the bus bars 224 and 244 and across the bus bars 258 and 244. Depending upon the condition of the register switches, such as 246 and 248, the high frequency source will be applied to one of the register bus bars 240 or 242.

When a register switch such as 246 is closed to extend the source of high frequency voltage to its respective bus bar, all of the tone oscillators such as 226 which are connected to that bus bar will be energized and will continue to be energized so long as the register switch is closed. The respective decoupling resistor 238 for each of the energized tone oscillators will therefore have the carrier frequency, amplitude modulated by the respective musical tone signal, impressed across it.

When a playing key is actuated, for example, that which corresponds to the tone oscillators 226 and 228 is depressed, the magnetic bar 260 will move in an inductive coupling direction; and, as the initial coupling is effected, the switch 252 will close, whereby the series circuit comprising the switch 252 and the coils 254 and 256 are connected in parallel across the decoupling resistor 238. The net effective change in magnetic flux caused by the amplitude modulated carrier flowing through the windings 254 and 256 will induce a corresponding voltage in the winding 258 which voltage is applied to the input to the demodulator 250. The carrier current is detected and applied to the filter 276 for removal of the high frequency carrier and modulation products of the wave. The low frequency musical tone signal appearing at the output of the filter is applied to the amplifier 278 by way of the manually operated swell control pedal circuit 280 and the amplified signals are applied to the speaker 282.

Because of the stray magnetic flux in the vicinity of each of the tone oscillators, it is advantageous to arrange the octavely related tone oscillators side by side. In this manner advantage can be taken of the stray magnetic flux for coupling the flux from oscillator to oscillator to provide a synchronization of the higher frequency oscillators by the lower frequency oscillators. Also, the rate at which the coupling core 260 is moved into the coils 254, 256 and 258 may be adjusted in such a manner as to control the attack and decay rates of the tones. The reversely wound winding 254 compensates for the slight coupling between the coils 256 and 258 in the released position of the key, and the closing and opening of the switch 252 by the playing key at the instant that the magnetic coupling between the coils 256 and 258 is established and eliminated by the reversely wound winding 254 prevents the introduction of key click noise in the output circuits.

Attention is directed to the reeds in FIGS. 1, 15, 23 and 25. It will be seen that the reeds may be placed at will for vibration in any number of directions relative to the axis of the coils and cores with which they cooperate; but in each instance at least a substantial portion of the reed movement will effect a change in the inductance of the coil.

The graph shown in FIG. 26 and the embodiments of FIGS. 27, 29 and 30 will now be described. These embodiments relate to the employment of the principle of energy time hysteresis of the present invention as applied to devices in which the mechanical oscillator performs useful work. FIG. 26 illustrates various hysteresis curves for certain variations of the relationship of the input current $I_N$ to the position of the mechanical oscillating system (System 2). If it is assumed that a mechanical oscillator (FIG. 27) is not mechanically loaded, then a hysteresis curve 300 of FIG. 26 will obtain. Now, if the oscillator is loaded, it is accompanied by the introduction of a greater amount of energy per period of oscillation with a consequent slight reduction of its natural frequency of oscillation as shown by the hysteresis curve 302. Further loading of the oscillator of sufficient degree will result in a curve 304 in which the amplitude of vibration of the mechanical system is reduced further; but the energy transfer to the mechanical system is reduced.

Accordingly, suitable dimensioning of the entire mechanism will produce the operating conditions best suited, for any particular purpose. By proper selection of component values in the series resonant circuit and in the mechanical oscillator and assuming that the selected supply voltage from the source is maintained relatively constant, the frequency of the mechanical oscillator may be adjusted to and reliably maintained at a desired value.

FIG. 27 shows a variation of the embodiment of FIG. 1 in which mechanical loading on the mechanical oscillator (vibrating element) may be varied for the purpose of varying the output frequency of the oscillator. If means are provided for varying the mechanical loading on the oscillator in a selected programming cycle, the output frequency may be similarly varied in accordance with the program. This may be particularly advantageous, for example, in controlling the rate of cutting in a planing machine or the like. Thus the embodiment of FIG. 27 comprises a source of high frequency current 320 which is connected to a series resonant circuit including a capacitor 322 and a coil 324. A cylindrical core 326 is mounted on a shaft 330 for reciprocable movement on bearings 323 in and out of the coil 324. A pendulum mass 328 is connected to the shaft 330 of the core through a lever assembly 332 pivoted at 333. The distance of the center of the mass 328 from the shaft determines the amount of effective mechanical loading applied to the mechanical oscillator and therefore its frequency. Thus, as the mass 328 is brought closer to the axis 334, the loading on the shaft 330 is reduced and the frequency of vibration of the core within the coil is increased.

The shaft is connected to a load 327 which is substantially less than the loading of mass 328, whereby variation of the load 327 will not appreciably affect the frequency of oscillation of the shaft.

If a conventional electric generator is coupled with the System 2 of FIG. 27, then depending on the adjustment of System 2, different frequencies corresponding to the frequency of System 2 can be taken off from the generator, and the entire system operates as a frequency converter.

Occasionally it may be desirable or necessary to continuously take off energy from the source of high frequency in such a manner that the modulating currents or envelopes of two separate oscillators have a desired out of phase relationship with each other. This is made possible by dividing the oscillator into a counter stroke drive as illustrated in the embodiment of FIG. 28 wherein a source of high frequency current 340 energizes a pair of series resonant circuits 342 and 344 and in which the mechanical vibratory elements 346 and 348 cooperating with the two resonant circuits are connected together so as to increase and decrease the inductances of the two circuits 180° out of phase with each other. Thus the cylindrical cores 346 and 348 are carried by a shaft 351 and biased by spring assemblies 350 and 352 for axial reciprocation within their respective coils. A load 349 is connected to the core 348. As the cores reciprocate along the axis of the coils, one of the cores is moving into its respective coil to increase the inductance of its series resonant circuit while the other core is moving out of its respective coil to decrease the inductance of its series resonant circuit. A mass 360 is connected symmetrically between the cores 346 and 348 and when the mass is symmetrically positioned at equal distances from the coils 354 and 356 (mechanical equilibrium point), no movement of the mass or the cores will occur. However, a slight shifting of the mass by energization of the coils to the magnetic equilibrium point which is displaced from the mechanical equilibrium point will cause the mass and core assemblies to begin to reciprocate at a predetermined frequency on their spring assemblies. This mode of operation improves the power factor of the apparatus.

In the embodiment of FIG. 29, an oscillator 364 somewhat similar to that of FIG. 1 is shown except that the inductance and capacity are each divided into three separate components, the total values of which determine in a well known manner the resonant frequency of the circuit. However, the voltages appearing across the individual inductance elements of FIG. 28 are at any instant in time substantially less than the voltages would be in an otherwise similar embodiment utilizing one coil instead of three. Thus the oscillator 364 comprises a source of carrier current 366, a series resonant circuit including inductive coils 368, 370 and 372 with a common core 374, capacitors 376, 378 and 380, and a resistor 382, and a vibratory reed 384.

The principle of energy-time-hysteresis of the present invention may also be utilized to drive a rotary device as shown in FIG. 30. However, the rotor 390 is not an oscillator but rather is aperiodic; and therefore its speed of rotation will be determined by the amount of energy introduced from a source of high frequency current 392 and upon the load on the rotor. The best torque characteristic and energy transfer are achieved when the mean resonant frequency of the resonant circuit equals the source frequency minus the rotor frequency. The source is connected to a series resonant circuit comprising a capacitor 394 and a coil 396 having a core 398. The rotor is non-symmetrical and will lower the inductance of the coil 396 as it rotates from the solid line position to the broken line position to increase the current flowing in the series circuit and the magnetic field attracting the rotor and vice versa to maintain movement of the rotor. However, external initial starting of the rotor by external means is required.

FIG. 31 shows another means for regulating the introduction of energy into the oscillator without mechanical contacts. This oscillator comprises a source of high frequency current 400 connected to a series resonant circuit including a capacitor 402, a coil 404 and its core 406 and a second coil 408. The coil 408 includes a core member 410 of a magnetic material and a second magnetic member 412 which is movable toward and away from the core member 410 to vary the inductance of the coil 408. Since the resonant frequency of the series circuit depends upon the inductance value of the coil 408 as well as that of the coil 404, the variations in the inductance of the coil 408 by means of the members 410 and 412 may be utilized to bring the resonant frequency of the circuit close to the frequency of the source 400 or substantially removed from it. When the frequency of the series circuit is close to that of the source 400, the introduction of energy into the core 406 and a cooperating reed 414 will be sufficient to initiate and sustain oscillations of the reed, thereby to amplitude modulate current from the source 400. However, when the position of the member 412 relative to 410 is such as to substantially detune series circuit from the source 400 the current in the circuit will fall to a relatively low value and the transfer of energy to the reed will be insufficient to initiate or sustain vibration thereof. This arrangement may therefore be used to start and stop the oscillator without the use of mechanical contacts.

If several drives or as previously discussed several exciter circuits (System 1) are connected together through a single inductance 408, in order to avoid cross-modulation, e.g. by shunting, of the various exciter circuits among themselves, the final or operative quantity of this inductance 408 may be compensated by capacitor 416 having an equal reactance so that the switch member consisting of inductance 408 and capacitance 416 is effective in operation with only the ohmic resistance of the coil. The starting and stopping of current flow in the series resonant circuit is also possible by varying the effective air gap between the reed and the core or by varying the resistance or capacitance of the circuit; and the control can be effected manually or by control circuits.

Although the source of carrier current such as 38 of FIG. 1 has been described as a source of alternating current, it will be appreciated that a direct-current-biased alternating current source or even a pulsating current source may be used, and the word "alternating" as applied to the source of electrical energy in the claim is to be interpreted in its broadest sense, including the above equivalents.

It has been found that by increasing the amount of the current supplied to the series resonant circuit in FIG. 1 by decreasing the value of the resistor 36, the energy transferred to the reed per cycle of operation is increased with a consequent increase in the length of the path in which the reed travels during its periodic oscillations. As the length of the path—that is, the amount of vibration of the reed—increases, the air resistance which must be overcome by the reed increases, and this air resistance causes a very slight reduction in the natural frequency of vibration of the reed.

On the other hand, maintaining the values of the series resonant circuit constant and increasing the voltage of the source 38 to increase the current through the circuit will cause an increase in the energy transferred to the reed per period of oscillation. This in turn increases the movement of the reed in its path to increase the mechanical air loading on the reed, whereby the frequency of the reed is slightly reduced. However, substantial changes in the electrical loading and in the electrical potential applied to the circuit are required before substantial shifting of the reed frequency of any consequence is observed.

The embodiment of FIG. 32 comprises a source of alternating current 432, for example at a frequency of 30 kc., which is applied to a parallel resonant circuit 435 comprising a capacitor 434 and a coil 436, by way of a low capacity, high impedance capacitor 440. The coil 436 of the resonant circuit is coupled to a winding 442 which feeds a high Q (20 or greater) resonant circuit 444 which includes an inductive coil 446 and a capacitor 438 tuned to a desired low frequency. The coupling between the coil 442 and the resonant circuit 444 is by way of a full wave rectifier comprising a pair of diodes 450 and 451 having a low internal resistance and capacitance and by way of an additional coil 454 having reversely wound windings which is also coupled to the coil 436.

The circuit 435 has a mean or average resonant frequency slightly below that of the source. The 30 kc. signals in the tank circuit 435 are induced in the coil 442, rectified by the diodes 450 and 451 and applied to the coil 446 as a D.C. pulsating current at 60 kc. This introduction of energy in the resonant circuit 444 causes it to oscillate at its natural resonant frequency. During one half of the cycle of oscillation of the circuit 14, the low frequency oscillating current is of a polarity as to be additive with the current induced in coil 442 from the resonant circuit 435 and flows through the coil 454, producing a relatively high magnetic field. This field increases the saturation of the core 456, thereby to reduce the current inducted in the coil 442 and to substantially decrease the value of the inductance of the coil 436, whereby the resonant circuit 435 is detuned further away from the generator frequency and its current amplitude is decreased. During the other half cycle of oscillation of the resonant circuit 444, the polarity of the diodes 450 and 451 prevents the flow of the low frequency tone current through the coil 454 and the core 456 becomes less saturated, whereby the inductance of the coil 436 is increased and the resonant frequency of the tank circuit 435 again approaches the frequency of the source 432 for a substantial increase in the current. In operation the circuit therefore produces an amplitude modulation of the carrier current in the tank circuit 435.

For a better understanding of the embodiment of FIG. 32, the following analogy with FIG. 1 is offered. The rectified current which is passing through the coil 454 changes the permeability of the magnetic core 456 and therefore changes the inductance of the coil 436. This rectification of the current passing the coil 454 corresponds to the rectifying effect of the magnetic field in FIG. 1. The changing of the permeability of the magnetic core 456 by the rectified current in the coil 454 corresponds to the change in the magnetic circuit caused by the vibrating reed in FIG. 1. The reversely wound windings of the coil 454 prevents the inducing of currents in the coils 436 and 442 by the coil 454.

The change in the mean value of the current supplied to the coil 454 by the diodes 450 and 451 causes a change of mean permeability of the core 456, and therefore a corresponding change in the mean value of the inductance of the coil 436. This in turn varies the mean value of the resonant frequency of the circuit 435 and therefore the mean value of the impedance presented by the circuit 435 to the current from the source 432.

The movement of the reed in FIG. 1 in its vibratory path of movement to change the inductivity of the coil, with which it cooperates, corresponds to the change in that portion of current flowing through the coil 454 which is taken from the coil 446 of the low frequency resonant circuit 444.

The actual working conditions of the embodiment of FIG. 32 are substantially identical to those of the embodiment of FIG. 1. The carrier frequency, amplitude modulated at the frequency of the resonant circuit 444, can be taken off from the parallel resonant circuit 435 by means of a low value resistor 438 or a coil of a few turns (not shown). Alternatively, the amplitude modulated carrier signal can also be taken off by a high value resistor (not shown) interposed between the source of alternating current 432 and the capacitor 440.

In the embodiment of FIG. 33, a series resonant circuit comprising a capacitor 466 and an inductor 464 having a coil 468 and a core 470 is energized by a 60 cycle alternating current source. The circuit is tuned to a frequency slightly below the source frequency and excites a pendulum 460 into oscillation at the predetermined natural low frequency of the pendulum. The pendulum drives a conventional clock mechanism 462 in the usual manner. The invention may therefore provide a simple and low cost yet very accurate clock mechanism drive.

It will be apparent that the resonant circuit of FIG. 33 may also be used as a positive drive for a balance wheel in a clock mechanism; and with a compact battery-operated transistor oscillator source, the circuit may be applied to the operation of a wrist watch of extreme accuracy by the use of well known techniques.

While there have been described what are believed to be the preferred embodiments of the invention, it will be appreciated that various changes and modifications may be made therein; and it is contemplated to cover in the appended claim all such changes and modifications as fall within the true spirit and scope of the invention.

I claim:

A device for producing electrical oscillations of a desired stable frequency from a source of audio frequency alternating current which has a frequency having any relationship with the desired frequency comprising said source of audio frequency alternating current, a series resonant circuit energized by said source and consisting of a resistor, a single fixed capacitor and a single inductor and a vibratory magnetic member having a natural resonant frequency substantially lower than the frequency of said source and positioned adjacent said inductor for vibratory movement in a plane in which the varying position of said magnetic member varies the value of the inductance of the inductor and in which the magnetic field of the inductor applies a force of attraction to said member, said series resonant circuit having a resonant frequency approximating said source frequency and the resonant frequency of the said series circuit fluctuating above and below said source frequency in synchronism with the motion of said vibratory member, the vibratory member being excited into oscillation at substantially its natural resonant frequency incident to energization of the resonant circuit by said source, said series circuit current being amplitude modulated thereby within the modulation frequency being the same as the natural frequency of the vibratory members.

References Cited by the Examiner

UNITED STATES PATENTS

| 1,645,301 | 10/27 | Slepian | 332—56 X |
| 1,645,302 | 10/27 | Slepian | 332—56 X |
| 1,886,815 | 11/32 | Hund | 331—37 X |
| 2,222,796 | 11/40 | Deval et al. | |
| 2,708,237 | 5/55 | Roberts | 332—51 X |
| 2,948,818 | 8/60 | Goto | 331—165 |

GEORGE N. WESTBY, *Primary Examiner.*

LAURENCE V. EFNER, *Examiner.*